United States Patent Office 3,022,153
Patented Feb. 20, 1962

3,022,153
METHOD OF PREPARING A STABLE LIQUID FERTILIZER FROM WET-PROCESS PHOSPHORIC ACID
Robert C. Miller, 879 Providence Ave., Webster Groves 19, Mo.
No Drawing. Filed Dec. 8, 1958, Ser. No. 778,585
7 Claims. (Cl. 71—29)

Commercial fertilizers are generally of two types, liquid and solid. To be effectively used by the ultimate consumer, a liquid fertilizer must be sprayable by ordinary spraying equipment. At the present time, solid fertilizers are made using impure or wet-process phosphoric acid and ammonia. Any impurities present in the acid are not bothersome in a solid fertilizer, since the composition is applied in dry form by commercial applicators or spreaders. However, wet-process phosphoric acid has not met with success in manufacturing liquid fertilizers, since the impurities in the acid react with the phosphates that are formed as the acid is neutralized to form insoluble precipitates which soon clog up ordinary spraying equipment. To avoid this difficulty, pure phosphoric acid is ordinarily used to make liquid fertilizers. This results in a fertilizer which has satisfactory spraying properties, but is expensive to produce.

Impure phosphoric acid contains iron and aluminum compounds generally believed to be in the form of

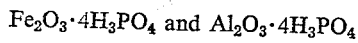
$Fe_2O_3 \cdot 4H_3PO_4$ and $Al_2O_3 \cdot 4H_3PO_4$

When the acid is neutralized, the corresponding phosphates of iron and aluminum are formed. These precipitates are gelatinous insoluble masses which settle out of the fertilizer composition, and which readily clog ordinary spraying equipment.

I have invented a method of compounding a liquid fertilizer which uses impure or wet-process phosphoric acid as a starting reagent, and which results in liquid fertilizer which is sprayable without using any special procedure or apparatus at the consumer level.

It is an object of the present invention to provide a liquid fertilizer composition which is sprayable even when made from impure phosphoric acid. A further object of this invention is to provide a liquid fertilizer composition wherein any iron phosphates or aluminum phosphates present are in a sprayable solution rather than a gelatinous precipitate.

Another object of this invention is to provide a sprayable liquid fertilizer composition wherein an amide complexing agent is present to form soluble complexes with any iron or aluminum impurities present in the composition. More specifically, it is an object to provide a sprayable liquid fertilizer composition wherein urea is present as the complexing agent to form complexes with any iron and aluminum phosphates present.

A further object of this invention is to provide a novel method of compounding a sprayable ammonium phosphate fertilizer composition from impure or wet-process phosphoric acid and ammonia.

Still another object is to provide a method of preparing a sprayable liquid fertilizer composition from wet-process phosphoric acid using urea as a complexing agent to keep any impurities of iron and aluminum in a sprayable solution.

Still another object of this invention is to provide a complete sprayable liquid fertilizer and method of preparing same from impure phosphoric acid and ammonia and including potassium salts, wherein urea is present to complex any impurities of iron and aluminum present, and wherein a protective colloid, such as gelatin, is present to insulate the soluble complex from the potassium electrolyte.

Still another object of this invention is to provide an alternate method of producing a sprayable liquid fertilizer wherein urea-ammonia liquor is used as the neutralizing agent. A further object is to provide a sprayable liquid fertilizer composition containing a suitable protective colloid, such as glycerin, to hold tricalcium phosphate in a colloidal state.

A further object is to provide a method of putting the iron and aluminum phosphate into a form wherein they are more readily available to the soil as nutrients.

These and other objects and advantages will become apparent hereinafter.

Briefly, the present invention comprises adding an amide, preferably urea to wet-process phosphoric acid and injecting aqueous ammonia until the solution is neutralized. If desired, a small quantity of an amine, preferably triethanolamine, can be added after neutralization has been completed. The temperature at the point where the ammonia is added to the urea-phosphoric acid is preferably above about 65° C. to enhance the complexing characteristics of the system. A complete fertilizer composition, i.e., one containing a potassium salt such as potash, can be compounded using the present invention by adding a protective colloid, such as gelatin, to the urea-phosphate solution before adding the potassium salt.

An alternate method of preparing the novel liquid fertilizer of this invention is to add a portion, preferably at least about 20%, of the total amount of urea to the wet-process phosphoric acid before neutralization, and then neutralize the acid with a urea-ammonia liquor containing the remaining urea.

If the wet-process acid contains gypsum, which is converted to insoluble tricalcium phosphate upon neutralization, a small amount of a protective colloid, such as glycerin, can be added to the aqueous ammonia or to the urea-ammonia liquor to hold the tricalcium phosphate in a colloidal solution.

The invention further comprises the novel methods of preparing a sprayable liquid fertilizer composition and in the fertilizer compositions produced by said methods, and hereinafter described and claimed.

A detailed description of the present invention follows:

An amide, preferably urea, is dissolved in water and the wet-process phosphoric acid is added to this solution. After the acid has been added to the urea-water solution, high speed agitation may be started, preferably using a blade with a shearing action having a blade tip linear speed of about 7,000 feet per minute. Aqueous ammonia is then injected into the vortex of the mixer while the stirring continues until a pH of from about 7.5 to about 8 is reached. An amine such as triethanolamine may be added as a final step, if the fertilizer is to stand for a long period of time.

Urea has been added to commercial fertilizers in the past to increase the nitrogen content. Commercial fertilizer is rated as to parts nitrogen, parts phosphate, and parts potash. In other words, a formulation called 13–13–0 would have 13 parts nitrogen calculated as nitrogen (N), 13 parts phosphate calculated as $P_2O_5$, and 0 parts potassium calculated as $K_2O$. Another common formulation is 6–6–6 or 6 parts N, 6 parts $P_2O_5$, and 6 parts $K_2O$.

Heretofore when urea has been added to fertilizer compositions, various calcium phosphates, ammonia, urea (or ammonia-urea liquor), and wet-process phosphoric acid have been slurried together in a semi-fluid condition and turned into solid fertilizers. This is much like the mixing of concrete in a concrete mixer. The heat of reaction between ammonia and acid removes much of the limited amount of water that is present. These formulations are not suitable for mixing with water to give a sprayable liquid fertilizer because the urea was not added to the mixture under the proper conditions which will be hereinafter more fully set forth. The heat of the reaction also may decompose the urea.

When urea has been added to liquid fertilizers to increase the nitrogen content, it is generally added after the acid neutralization. Since the acid used in these liquid fertilizers is pure phosphoric acid, there are no iron or aluminum impurities for the urea to complex.

In the preferred method of compounding a sprayable liquid fertilizer, the urea is premixed with the acid. It is believed that the mechanics of the chemical reactions that occur in forming the product of this invention are as follows:

Commercial wet-process phosphoric acid usually contains up to about 2% each of iron and aluminum impurities on an $Al_2O_3$ and $Fe_2O_3$ basis. These are believed to exist as $Al_2O_3 \cdot 4H_3PO_4$ and $Fe_2O_3 \cdot 4H_3PO_4$. When urea is added to the phosphoric acid, urea-phosphoric acid is formed. It has a formula of $NH_2(CO)NH_2 \cdot H_3PO_4$.

When ammonia is added to the phosphoric acid, which now contains molecules of urea-phosphoric acid as above described, as well as the iron and aluminum phosphates already present in the wet-process acid, the following reactions are believed to take place:

$Al_2O_3 \cdot 4H_3PO_4 + 2NH_4OH \rightarrow 2AlPO_4$ (nascent)
$\qquad + 2NH_4H_2PO_4 + 5H_2O$
$Fe_2O_3 \cdot 4H_3PO_4 + 2NH_4OH \rightarrow 2FePO_4$ (nascent)
$\qquad + 2NH_4H_2PO_4 + 5H_2O$
$NH_2CONH_2 \cdot H_3PO_4 + NH_4OH \rightarrow NH_4H_2PO_4$
$\qquad + NH_2CONH_2$ (nascent) $+ H_2O$ As the acid molecules are neutralized by the ammonia, the bond between the acid and urea is broken, leaving the urea in a nascent or highly reactive state and ready to form new bonds. The newly formed aluminum phosphate and iron phosphate are in a similar nascent state and bond with the urea to form $NH_2(CO)NH_2 \cdot AlPO_4$ and $NH_2(CO)NH_2 \cdot FePO_4$ which are held in solution and give a sprayable liquid fertilizer.

When the terms solution or soluble complex are used in reference to the urea-aluminum phosphates or urea-iron phosphates, it is intended to mean a formulation that for all practical purposes acts like a true solution whether it be in the nature of a colloidal solution or a true solution.

It is important to the success of the present invention that some urea-phosphoric acid be formed before the acid is neutralized so that the neutralization can transform the urea into a nascent state wherein it can react with the iron and aluminum phosphates.

As more ammonia is added to the composition, the pH moves above 7.0, and the monoammonium phosphate, $NH_4H_2PO_4$, formed in the neutralization of the urea-phosphoric acid becomes diammonium phosphate, $(NH_4)_2HPO_4$, as follows:

$NH_4H_2PO_4 + NH_4OH \rightarrow (NH_4)_2HPO_4 + H_2O$

Since urea-ammonia liquor is currently available commercially, it is desirable to be able to use it in compounding a liquid fertilizer. However, if the urea-ammonia liquor is added directly to the impure phosphoric acid, the following reactions are among those that take place:

$Al_2O_3 \cdot 4H_3PO_4 + 2NH_4OH + NH_2(CO)NH_2 \rightarrow 2AlPO_4$
$\qquad + 2NH_4H_2PO_4 + 5H_2O + NH_2(CO)NH_2$ (inert)
$Fe_2O_3 \cdot 4H_3PO_4 + 2NH_4OH + NH_2(CO)NH_2 \rightarrow 2FePO_4$
$\qquad + 2NH_4H_2PO_4 + 5H_2O + NH_2(CO)NH_2$ (inert)

When urea is mixed with ammonia to form urea-ammonia liquor, it does not react with the ammonia as it does when it is mixed with phosphoric acid, but it is merely dissolved in the ammonia. Thus, when the ammonia is reacted with the acid, the urea is not in a nascent state but is in an inert form which does not react with the aluminum and iron phosphates formed in the neutralization.

In a modification of the method of producing a sprayable liquid fertilizer from wet-process phosphoric acid hereinbefore described, I have invented a method whereby urea-ammonia liquor can be utilized to produce my novel liquid fertilizer.

In the modified process, a portion, preferably at least about 20% of the total amount of urea to be added to the final formulation is added to the wet-process phosphoric acid as hereinbefore described. This differs from the original method, in that, in the original method all of the urea was added to the phosphoric acid. This addition of urea to acid produces urea-phosphoric acid as before:

$H_3PO_4 + NH_2(CO)NH_2 \rightarrow NH_2(CO)NH_2 \cdot H_3PO_4$

When ammonia-urea liquor is added, the following reactions are believed to occur:

$NH_2(CO)NH_2 \cdot H_3PO_4 + NH_4OH + NH_2(CO)NH_2$
$\qquad \rightarrow NH_4H_2PO_4 + H_2O + NH_2(CO)NH_2$ (nascent)
$\qquad\qquad + NH_2(CO)NH_2$ (inert)

The inert urea can react with the free acid in the mix (there is always an excess of acid in the reactor if the ammonia is sparged into the acid) to form more urea-phosphoric acid as above described. The reaction cycle then proceeds to repeat itself as above.

When the acid is neutralized, nascent aluminum and iron phosphates are formed as in the first method. The already present urea-phosphoric acid is also neutralized by the ammonia liquor to form a nascent urea molecule which will react with the nascent aluminum and iron phosphates. Thus, the aluminum and iron phosphate are held in solution by the 20% or so of the urea in the acid in a sort of "delaying action" until the urea present in the urea-ammonia liquor can be converted to urea-phosphoric acid, neutralized to form nascent urea, and this nascent urea reacts with nascent iron and aluminum phosphates. After the initial "delaying action" or holding action by the nascent urea which was present in the acid, the reaction is self-sustaining on the urea-ammonia liquor added to neutralize the acid.

It is important that the original amount of urea be in the acid before neutralization is started so that it can catch any iron or aluminum phosphates before they can form insoluble agglomerates. These phosphates are formed as soon as neutralization starts, and will cause undesirable turbidity or cloudiness in the solution if some urea-phosphoric acid is not present to combine with them.

As little as one mole of urea can be used for each mole of ferric phosphate and aluminum phosphate present in the acid. This small amount will give some complexing action, however, from a practical viewpoint it is desirable to add a large amount of urea. There is no upper limit to the amount of urea that can be added, save for that imposed by the amount of nitrogen allowable in a specified grade of fertilizer. A preferred composition includes at least about as much nitrogen present as urea as there is nitrogen present in ammonium phosphate. It is desirable to have somewhat more than the minimum amount of urea present when potassium chloride is in the formulation because some ammonium chloride is formed and it tends to complex with some of the urea. Any diammonium phosphate that is formed will also tend to complex with some of the urea.

An amide such as acetamide, diacetamide, and triacetamide can be used in place of urea with some success. Benzamide, dibenzamide, and tribenzamide also will give somewhat satisfactory results, but the solubility of the latter three in water is somewhat limited. Other compounds of this class should be satisfactory, also. Urea is certainly preferred, at the present time, from an economic standpoint.

Urea gives inconsistent complexing under cold conditions. While the reaction will work above about 40° C., it is preferably carried out at a temperature above about 65° C. If the reaction is carried out below this temperature, careful handling and proper agitation at the point of addition are necessary to prevent the insoluble precipitates from being partially formed before the urea has an opportunity to complex them, with the result that they do not get into a complexed state. Present plant facilities also make a reaction temperature above about 65° C. desirable. This reaction can be continued up to about the melting point of urea, which is 133° C. However, the other components give the formulation a boiling point of only a few degrees over 100° C., and there is no danger of exceeding the upper limit.

With proper handling, artificial heat will not be needed, since the reaction of ammonia and acid is exothermic. If all of the urea, acid, and water is put into the reactor tank before any ammonia is added, it will be some time before ordinary "sparging" in of ammonia will get the mass to about 65° C. In the meantime, some uncomplexed iron phosphate and aluminum phosphate will come down, and these gelatinous masses will not go into solution later.

In view of the foregoing, it is preferable to operate a continuous plant in which the components are metered together continuously in the proper proportions. Gelatin and a potassium salt could, if desired, be injected farther along in the process.

If it is desired to operate batchwise, because of existing plant facilities or the like, the entire operation could be handled in increments. In other words, some of the acid and urea could be added to the reactor, and then some ammonia injected. The alternate stepwise addition of reactants would start the evolution of heat at an early stage of the operation, and would raise the temperature of the reaction to the desired level. The addition of reactants in increments is then continued until the reactor is filled, or the desired amount of fertilizer is formed.

It is preferable to stop the ammoniation step when a pH of about 7.5 to about 8 is reached. If the pH gets much above this point the solubility of the nutrients is decreased and they tend to "salt-out" of solution.

Liquid fertilizers are often stored for several months or more before they are used. During storage, the urea complexes tend to break down and release the iron and aluminum phosphates. These phosphates tend to combine to form insoluble gelatinous masses. In another modification of the present invention, amines can be added to the fertilizer compositions to retard this complex disintegration. It will often be unnecessary, and indeed undesirable, to add an amine, since the urea will hold the insoluble phosphates in a complexed state for up to about 3 or 4 days. Especially during the rush season when the fertilizer is often applied within 12 hours after manufacture, an amine will merely add to the cost without providing any beneficial effects.

The amines are added after the addition of ammonia is completed, and the solution has reached a pH of about 7.5 to about 8. As hereinbefore indicated, this compound is added to take care of any iron or aluminum phosphate that may become uncomplexed upon standing. These amines catch the phosphates in a nascent state after breaking from the urea, before they have an opportunity to combine in agglomerates to form the insoluble gelatinous mass so undesirable in liquid fertilizer compositions.

The amount of amine, preferably triethanolamine, is related to the amount of phosphoric acid in the fertilizer composition. For every 200 parts by weight $P_2O_5$ equivalent in the fertilizer composition, it is desirable to add at least about 1 part by weight amine. It is preferred not to go above about 10 parts by weight amine per 100 parts by weight $P_2O_5$ equivalent. The reason for this preferred upper limit is that the amines generally have a pH above about 8.0, and a high overall pH in a liquid fertilizer solution tends to induce "salting-out" of the nutrients as hereinbefore explained in relation to the addition of ammonia. However, as far as the formation of complexes is concerned, the more amine that is added the greater is the complexing effect, up to about 20 parts amine per 100 parts $P_2O_5$ by wight.

Among the other amines that will work besides the ethanolamines are the methylamines and the ethylamines. However, there are precautions which must be taken if these other amines are used. If the fertilizer is to be applied to foliage, the ethyl and methylamines can have the action of a contact herbicide, and care must be used in their application. They also have a high volatility and create a fire hazard in compounding the fertilizer. Also, since the urea is added preferably above about 65° C. the mixture must be cooled down before the ethylamines and methylamines can be added. Due to low volatility, very low fire hazard, and absence of herbicidal effect, the ethanolamines are preferred, principally triethanolamine.

Since the ethanolamines are somewhat more basic than ammonia, the fertilizer solution preferably should be basic before they are added. Otherwise, the acid would tend to neutralize the amine as well as the ammonia, with a resultant waste of expensive amine. As the triethanolamine molecule is very large, its migrating ability is less than the smaller ammonia molecule and thus the ammonia will tend to reach the acid and react with it before the triethanolamine can be neutralized. However, this is not a practical operation in a large industrial process and it is preferred to have the fertilizer solution slightly basic before adding the amine.

When ammonia is added to the urea-water and acid mixture, the solution preferably is stirred by mechanical means, although the reaction proceeds without mixing. The compounding of the complexed solution is based on sound chemical grounds, however, mixing plays a part in getting consistently good results. Commercial turbine-mixers are more satisfactory than screw propeller types, and can be operated by less skilled personnel.

If it is desired to compound a complete fertilizer, i.e., one containing potassium (generally in the form of potash), a protective colloid, such as gelatin, can be added after the amine to protect the solution from the action of the potash electrolyte. Gelatin does not go into a true solution, but has to be mechanically reduced to a colloid. It is preferred to use a turbine-mixer rather than a screw propeller type. With an ordinary mixer, the gelatin tends to form undesirable "globs." A turbine mixer will chop it up to colloidal size. If gelatin were to become available as an aqueous colloidal concentrate, this would form an ideal medium for adding the gelatin to the fertilizer. At the present time, however, a commercial turbine mixer is preferred.

The amount of gelatin can be as small as 1 part in 100,000 parts by weight of the formulation. It is preferred to use at least 1 part in 16,000 parts by weight of the formulation, and up to about 1 part gelatin in 2,000 parts by weight of the formulation can be used. If more gelatin is used, there are no deleterious chemical effects, but the formation of the hereinbefore mentioned "globs" is more likely.

If only a small amount of potassium salt is present in the fertilizer, the urea may act as a protective colloid against the decomplexing action of these electrolytes, however, it is preferred to add gelatin whenever potassium is present. Other protective colloids that can be used in place of gelatin include glycerin, cane sugar, starch, dextrin, and various stearates. Acids, such as tartaric acid, are not good for this purpose.

Certain commercial grade wet-process phosphoric acids have an amount of gypsum (calcium sulfate; $CaSO_4 \cdot 2H_2O$) dissolved therein. The gypsum is soluble in phosphoric acid, but when the acid is neutralized it is believed that the gypsum reacts to form tricalcium phosphate. This is a crystalline type precipitate which can be filtered or decanted from the remainder of the system.

However, it is not necessary to go through the filtering or decanting step, as the tricalcium phosphate can be held in colloidal solution by the addition of a protective colloid such as glycerin to the system. Gelatin also may be used, but the final formulation has to be quite dilute or the gelatin will precipitate out as a gelatinous mass which will also clog spraying equipment. Glycerin is dispersible in ammonia and leaves no precipitate in the final formulation. It is preferred, however, to filter out the crystalline tricalcium phosphate. If glycerin is added, the amount will vary depending upon the amount of gypsum in the acid, however the limits on the amounts of glycerin are generally about the same as the limits on the amounts of amine.

An alternative method of preparing a liquid fertilizer is as follows: Add a predetermined amount of an amine such as triethanolamine to an aqueous ammonia solution. Add wet-process phosphoric acid and stir, preferably with a turbine blender as before. Since heat is evolved, cooling may be necessary particularly if a volatile amine is used.

This reaction is different from my previous reaction in that the ammonia is acidified rather than the acid being ammoniated. Thus the reaction is basic at all times, rather than acidic. The amounts of amine are the same as in the previous method, that is, from about 0.5 part to about 10 parts by weight amine per 100 parts by weight of $P_2O_5$ equivalent. No urea is used in this reaction.

This reaction must be carefully handled, or it will not give completely satisfactory results. The amines are bases, similar to ammonia. Therefore, acidification of the ammonia-triethanolamine solution neutralizes the triethanolamine, or at least some part of it. The preferred amine, triethanolamine, is somewhat more disassociated than ammonia, and potentially very reactive. However, the triethanolamine molecule is very large and its migrating ability is consequently limited. Thus the ammonia can react with the acid before much of the amine has a chance to do so. This is somewhat satisfactory, but not completely so, since there is still some amine wasted. If the amine is added after the solution is neutralized, the iron and aluminum phosphate precipitates have already formed, and will not go back into solution. The amine must be present when the molecules are in a nascent state, and before they have begun to agglomerate into precipitates. The amine in aqueous ammonia solution will do this, however, it is wasteful of amine and at the present time, economically unsound. If the price of amine should decrease, it may become an economically feasible operation.

The neutralization of phosphoric acid with ammonia gives a ratio of N to $P_2O_5$ of about 1:3. If enough urea is used to give about as much N as is present in the ammonia (the preferred ratio in this invention), then the lowest ratio of N to $P_2O_5$ is 2:3. This is generally a satisfactory fertilizer, since nitrogen is being stressed more and more agronomically, and ratios of N to $P_2O_5$ of 1:1, 3:2, or even 2:1 are not unusual. However, if a lower ratio of N to $P_2O_5$ is desired, for example, a ratio of N to $P_2O_5$ of 1:4, some soluble phosphate other than an ammonium salt can be added at the same time as the potash, or in lieu of the potash. A soluble potassium phosphate can be used if both a potassium nutrient and more phosphate are desired.

If the nitrogen content needs to be raised, ammonium nitrate can be added after the gelatin is added. Other soluble nitrates such as potassium nitrate can also be added at this point. The use of two nutrient compounds, such as potassium nitrates and phosphates allows fertilizers to be compounded which are more concentrated in plant nutrients.

The following are examples of formulations made by the present invention, all of these formulations being sprayable. They result in a clear, slightly red solution, caused by the iron present.

*Example I*

A sprayable liquid fertilizer is formulated by mixing 3.82 ounces (oz.) water, 2.41 oz. wet-process phosphoric acid (approximately 75% $P_2O_5$), and 1.93 oz. urea (U.S.P.). The urea is stirred into solution. 1.84 oz. aqueous ammonia (28.7%) C.P. is added to the above solution, and the temperature is raised to about 67°–70° C. The formulation is adjusted to about pH 8 with a few drops of ammonia, using pHyrion indicator paper made by Micro Essential Laboratories, Brooklyn 10, N.Y. This produces a sprayable liquid fertilizer. If it is desired to store the fertilizer for more than about 3 days, 1.3 cc. of triethanolamine are added to the formulation. This gives a liquid fertilizer which is stable over a period of months. This fertilizer is about a 13–13–0 grade.

*Example II*

The formulation of Example I is repeated, except that 1.3 cc. methylamine (40% in water, C.P.) is substituted for the 1.3 cc. of triethanolamine. This formula gives the best amine complexing action, but the methylamine is very volatile and has a tendency to vaporize upon standing, particularly if the storage area is warm. To minimize the amine loss by vaporization, the ultimate user can place a film of motor oil over the surface of the finished formulation. This is effective in cutting down vaporization of the amine.

*Example III*

The formulation of Example I is repeated except that 1.3 cc. of triethanolamine and 1.3 cc. of ethylamine are used instead of pure triethanolamine. This formulation gives a good complexing effect and good stability.

*Example IV*

This is an example of a complete liquid fertilizer formulation, i.e., one containing potassium which is stable and sprayable. 1.67 oz. wet-process phosphoric acid, 1.33 oz. urea, and 1.43 oz. water are mixed together until the urea is dissolved. 1.27 oz. of aqueous ammonia is added to neutralize the acid. The solution is maintained at about 65° C. A small amount of U.S.P. gelatin is added to the solution. Some of it disperses, but most forms into a ball-like mass. 1.45 oz. of potassium chloride (C.P. KCl) is dissolved in 2.85 oz. water and added to the neutralized solution. The solution is then adjusted to a pH of about 7.5. If desired, 1.3 cc. of triethanolamine can be added at this point. The solution is filtered to remove the mass of excess gelatin, leaving about 0.0006 oz. of gelatin remaining as a protective colloid. If the gelatin is present during neutralization, the resultant mass is unfilterable because the gelatin becomes so finely dispersed that it agglomerates as a unit. This fertilizer approximates a commercial 9–9–9 formulation. The gelatin is added to protect the urea complexed aluminum and iron phosphates from the decomplexing action of the potassium electrolyte. The grades of chemicals used are the same as those of Example I.

*Example V*

The formulation of Example I is repeated, except that 1.3 cc. glycerin (U.S.P.) are dispersed in the aqueous ammonia before it is added to the acid. This results in a highly desirable fertilizer composition wherein the tricalcium phosphate formed in the neutralization reaction is held in solution by the glycerin. This formulation is very stable and sprayable with no undesirable precipitates. This formulation can be made using 0.6 cc. methylamine and 0.6 cc. triethanolamine instead of 1.3 cc. triethanolamine. If the fertilizer is to be used soon after manufacture, no amine at all need be added.

*Example VI*

This formulation is made using urea-ammonia liquor as the neutralizing agent and illustrates a modification of the preferred method of making a sprayable liquid fertilizer. 1.95 oz. wet-process phosphoric acid (about 75% $P_2O_5$) is mixed with 1.5 oz. urea (U.S.P.) and 2.08 oz. water. A second solution is prepared containing 1.41 oz. aqueous ammonia (28.7%) C.P., 1.08 oz. urea, and 2.08 oz. water. If desired about 1 cc. glycerin can be included in the second solution. The solutions are heated to about 71–75° C., and the second solution is poured rapidly into the first solution. This gives a sprayable liquid fertilizer which has no undesirable gelatinous precipitates contained therein. If the fertilizer is to be stored for a long period of time, 1.0 cc. 40% methylamine and 1.0 cc. triethanolamine can be added to the solution. This formulation approximates a 15–10–0 grade fertilizer. If potash is desired in the fertilizer, gelatin can be added as in Example IV.

*Example VII*

Another formulation using the alternate method is compounded as follows:

0.92 oz. wet-process phosphoric acid is mixed with 0.80 oz. urea and 1.82 oz. water until the urea is dissolved. A second solution is prepared by mixing 0.72 oz. aqueous ammonia, 2.11 oz. urea, and 3.65 oz. water. If desired, about 1 cc. glycerin can be added to the second solution. The second solution is poured rapidly into the first solution at a temperature of 70° C. Ammonia is added until the pH is about 7.5 or 8. If desired, 1.3 cc. triethanolamine can be added to increase the storability of this fertilizer. If $K_2O$ is added to the mix in some form, gelatin may be added as in Example IV to protect the urea complexes from the potassium electrolyte.

The availability of the iron and aluminum phosphates to the soil as nutrients is increased when they are combined with urea, the phosphates being rendered more soluble when so combined. Thus, if urea is added to wet-process phosphoric acid and ammonia to produce a solid fertilizer, the resulting formulation will not result in a satisfactory sprayable liquid fertilizer if mixed with water, but a greater proportion of the normally insoluble iron and aluminum phosphates will be available as plant nutrients and more readily utilizable by the soil.

Thus, it is apparent that I have provided a novel fertilizer composition and method of preparing same which fulfills all of the objects and advantages sought therefor.

This invention is intended to cover all changes and modifications of the examples of the invention herein chosen for purposes of the disclosure, which do not constitute departures from the spirit and scope of the invention.

What is claimed is:

1. A method of preparing a stable sprayable fertilizer composition essentially free of insoluble precipitates including the steps of adding urea to wet-process phosphoric acid containing impurities selected from the group consisting of iron and aluminum compounds, at least an equimolecular amount of urea being added based on the moles of said impurities present, to form unstable urea-phosphoric acid and ammoniating said acid at a temperature above about 65° C. until the composition reaches a pH of from about 7.5 to about 8, the normally insoluble phosphates selected from the group consisting of iron phosphate and aluminum phosphate present in the composition after ammoniation being formed into a soluble complex with the urea.

2. A method of preparing a sprayable liquid fertilizer composition including the steps of adding urea to wet-process phosphoric acid containing impurities selected from the group consisting of iron and aluminum compounds, ammoniating said acid at a temperature above about 65° C. until the composition reaches a pH from about 7.5 to about 8, the normally insoluble phosphates selected from the group consisting of iron phosphate and aluminum phosphate present in the composition after ammoniation being formed into a soluble complex with the urea, there being at least as much urea as normally insoluble phosphate in said composition on a molar basis, and adding at least from about 1 part by weight to about 20 parts by weight of amine for each 200 parts by weight $P_2O_5$ equivalent in said composition, said composition being essentially free of spray nozzle clogging precipitates and being stable upon aging.

3. A method of preparing a sprayable liquid fertilizer including the steps of adding at least about 20% of the total amount of urea to be added to the composition to wet-process phosphoric acid to form urea-phosphoric acid, said wet-process phosphoric acid containing impurities selected from the group consisting of aluminum and iron compounds, mixing urea-ammonia liquor with the acid at a temperature above about 40° C. until the composition reaches a pH of from about 7.5 to about 8, to form nascent urea and nascent iron and aluminum phosphates, said urea bonding to the normally insoluble iron and aluminum phosphates formed during ammoniation of the composition to form a soluble complex, there being at least as much urea as normally insoluble phosphate in said composition on a molar basis, and adding from about 1 part by weight to about 20 parts by weight of an amine for each 200 parts $P_2O_5$ equivalent in the composition, said composition being stable upon aging.

4. A method of preparing a sprayable liquid fertilizer substantially free of spray nozzle clogging precipitates including the steps of adding urea to wet-process phosphoric acid to form urea-phosphoric acid, said wet-process phosphoric acid containing impurities selected from the group consisting of iron and aluminum compounds, at least an equimolecular amount of urea being added based on the moles of said impurities present in the composition, adding ammonia to this material at a temperature above about 40° C. until the pH reaches from about 7.5 to about 8 to release the urea in a nascent state and to form nascent aluminum and iron phosphates, said urea bonding to and solubilizing the normally insoluble aluminum and iron phosphates present after substantial neutralization of wet-process phosphoric acid, and adding up to about 20 parts by weight of an amine for each 100 parts by weight $P_2O_5$ equivalent in said composition to complex in a soluble state any of the iron or aluminum phosphates which come unbonded from the urea upon aging of the fertilizer, to provide a stable sprayable liquid fertilizer composition.

5. A method of rendering wet process phosphoric acid containing impurities selected from the group consisting of iron and aluminum compounds free of the normally insoluble gel-like precipitates of iron and aluminum phosphate present after said acid is neutralized, including the steps of adding at least an equimolecular amount of urea to said acid based on the molar amounts of the aluminum and iron impurities present, and ammoniating said solution at a temperature above about 40° C. until a pH of from about 7.5 to about 8 is reached.

6. A process of rendering wet process phosphoric acid containing impurities selected from the group consisting of iron and aluminum compounds free of the normally insoluble gel-like iron and aluminum phosphates present when said acid is neutralized including the steps of mixing urea with wet process phosphoric acid, said wet process phosphoric acid containing up to about 2% of iron and aluminum impurities on an $Al_2O_3$ and $Fe_2O_3$ basis, respectively, at least an equimolecular amount of urea being added based on the amounts of aluminum and iron impurities present to form unstable urea phosphoric acid, and adding ammonia to the urea-phosphoric acid at a temperature above about 65° F. until a pH of from about 7.5 to about 8 is reached, thereby breaking the bond between the acid, the urea and releasing nascent urea, forming normally insoluble aluminum phosphate and iron phosphate in a nascent state, and combining the nascent urea with the nascent aluminum phosphate and nascent iron phosphate to form soluble urea-aluminum phosphate and urea-iron phosphate.

7. A method of preparing a stable sprayable liquid fertilizer composition including the steps of adding urea to wet process phosphoric acid to form urea-phosphoric acid, said wet process phosphoric acid containing impurities selected from the group consisting of iron and aluminum compounds, at least an equimolecular amount of urea being added based on the moles of said impurities present, and ammoniating said urea phosphoric-acid composition at a temperature above about 40° C. until a pH of about 7.5 to about 8 is reached, the normally insoluble iron and aluminum phosphates formed during ammoniation being formed into a soluble complex with the urea.

References Cited in the file of this patent

UNITED STATES PATENTS

| | | |
|---|---|---|
| 1,355,369 | Washburn | Oct. 12, 1920 |
| 1,559,516 | Breslauer et al. | Oct. 27, 1925 |
| 2,102,830 | Biell | Dec. 21, 1937 |
| 2,222,734 | Bancroft et al. | Nov. 26, 1940 |
| 2,222,735 | Bancroft et al. | Nov. 26, 1940 |
| 2,279,200 | Keenen | Apr. 7, 1942 |
| 2,703,276 | Hendrick et al. | Mar. 1, 1955 |
| 2,770,538 | Vierling | Nov. 23, 1956 |
| 2,792,286 | Wordie et al. | May 14, 1957 |
| 2,799,569 | Wordie et al. | July 16, 1957 |
| 2,814,556 | Christoffel | Nov. 26, 1957 |
| 2,869,996 | Vierling | Jan. 20, 1959 |
| 2,891,856 | Getsinger et al. | June 23, 1959 |

FOREIGN PATENTS

| | | |
|---|---|---|
| 300,329 | Great Britain | Nov. 15, 1928 |